United States Patent
Khemani et al.

(10) Patent No.: US 9,858,102 B2
(45) Date of Patent: Jan. 2, 2018

(54) DATA PATH FAILOVER METHOD FOR SR-IOV CAPABLE ETHERNET CONTROLLER

(71) Applicant: DELL PRODUCTS, L.P., Round Rock, TX (US)

(72) Inventors: Lucky Pratap Khemani, Bangalore (IN); Janorious Rabeela, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/718,305

(22) Filed: May 21, 2015

(65) Prior Publication Data
US 2016/0342437 A1    Nov. 24, 2016

(51) Int. Cl.
| | |
|---|---|
| G06F 9/455 | (2006.01) |
| G06F 11/14 | (2006.01) |
| G06F 11/16 | (2006.01) |
| G06F 11/30 | (2006.01) |
| G06F 11/34 | (2006.01) |
| H04L 12/24 | (2006.01) |
| H04L 12/26 | (2006.01) |

(52) U.S. Cl.
CPC ...... *G06F 9/45558* (2013.01); *G06F 11/1464* (2013.01); *G06F 11/1658* (2013.01); *G06F 11/3006* (2013.01); *G06F 11/3409* (2013.01); *H04L 41/0654* (2013.01); *H04L 41/0816* (2013.01); *H04L 43/0811* (2013.01); *G06F 2009/4557* (2013.01); *G06F 2009/45579* (2013.01); *G06F 2201/805* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 2009/0133028 A1* | 5/2009 | Brown | ................... | G06F 13/385 718/104 |
| 2012/0254862 A1* | 10/2012 | Dong | .................... | G06F 9/4856 718/1 |
| 2015/0150000 A1* | 5/2015 | Anumalasetty | ........... | G06F 3/06 718/1 |

* cited by examiner

*Primary Examiner* — Emerson Puente
*Assistant Examiner* — Jonathan R Labud
(74) *Attorney, Agent, or Firm* — Isidore PLLC

(57) ABSTRACT

A method and an information handling system (IHS) provide data path failover for a single root input/output virtualization network interface controller (SR-IOV NIC) card. According to one aspect, an IOV failover module (FM) enables a physical function (PF) driver in a service virtual machine (VM) to access physical resources and configure virtual functions (VFs) within the SR-IOV NIC card. The IOVFM monitors data paths established between VMs and VFs. If a data path fails, the IOVFM initiates a failover by migrating a VF coupled to a failed data path to an alternate VF. However, if a threshold number of consecutive failed migration attempts occurs and the SR-IOV NIC card has an additional and available port(s), the IOVFM migrates the VF to an alternate VF of the available port. The IOVFM enables the VM to access and configure the alternate VF of the available port via a failover data path.

18 Claims, 6 Drawing Sheets

DATA PATH FAILOVER METHOD FOR SR-IOV CAPABLE ETHERNET CONTROLLER

BACKGROUND

1. Technical Field

The present disclosure generally relates to information handling systems (IHS) and in particular to failure detection and recovery within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSes typically include I/O network interface controllers (NICs). These NICs also include single root input/output virtualization (SR-IOV) capable NIC cards. These SR-IOV capable NIC cards are shared across multiple Virtual Machines (VMs). A VM is directly connected to the I/O device so that the main data movement, which requires increased processor utilization, can occur without involvement of a virtualization manager or hypervisor.

Many solutions are available for external network failover monitoring and switchover. Similar approaches have generally been applied to internal data path failover, which is as important for data centers as is external network failover. These conventional approaches include NIC teaming supported by an aggregation control protocol. However, the legacy failover mechanism used in NIC teaming and which utilizes the aggregation control protocol or other protocols utilized to support "port trunking" or "link bundling" doesn't support a failover mechanism for a single SR-IOV having a single port or multiple ports. The legacy failover mechanism supports two SR-IOV adaptors. For example, in this case, the legacy mechanism involves switching from one SR-IOV card (i.e., 256 light weight PCIe devices, VF devices) to another SR-IOV card (i.e., 256 light weight PCIe devices, VF devices). This failover mechanism which involves switching from one NIC card to another is a very costly failover approach.

BRIEF SUMMARY

Disclosed are a method and an information handling system (IHS) that provides data path failover for a single root input/output virtualization (SR-IOV) network interface controller (NIC) card or SR-IOV NIC card. According to one aspect, an IOV failover module (FM) enables a physical function (PF) driver in a service virtual machine (VM) to access physical resources and configure virtual functions (VFs) within the SR-IOV NIC card. The IOVFM utilizes a health monitoring module (HMM) within an enhanced hypervisor/virtual machine manager (VMM) to monitor data paths established between VMs and corresponding VFs. If a data path fails, the IOVFM initiates a failover by migrating the VF coupled to the failed (or compromised) data path to a redundant VF. However, if a threshold number of consecutive failed migration attempts occurs and the SR-IOV NIC card has an additional and available port(s), the IOVFM enables the PF driver to access and configure an alternate PF of the next available port and migrates the VF to an alternate VF of the available port. The IOVFM enables the VM to access and configure the alternate VF of the available port via a failover data path using an input/output virtualization manager (IOVM).

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
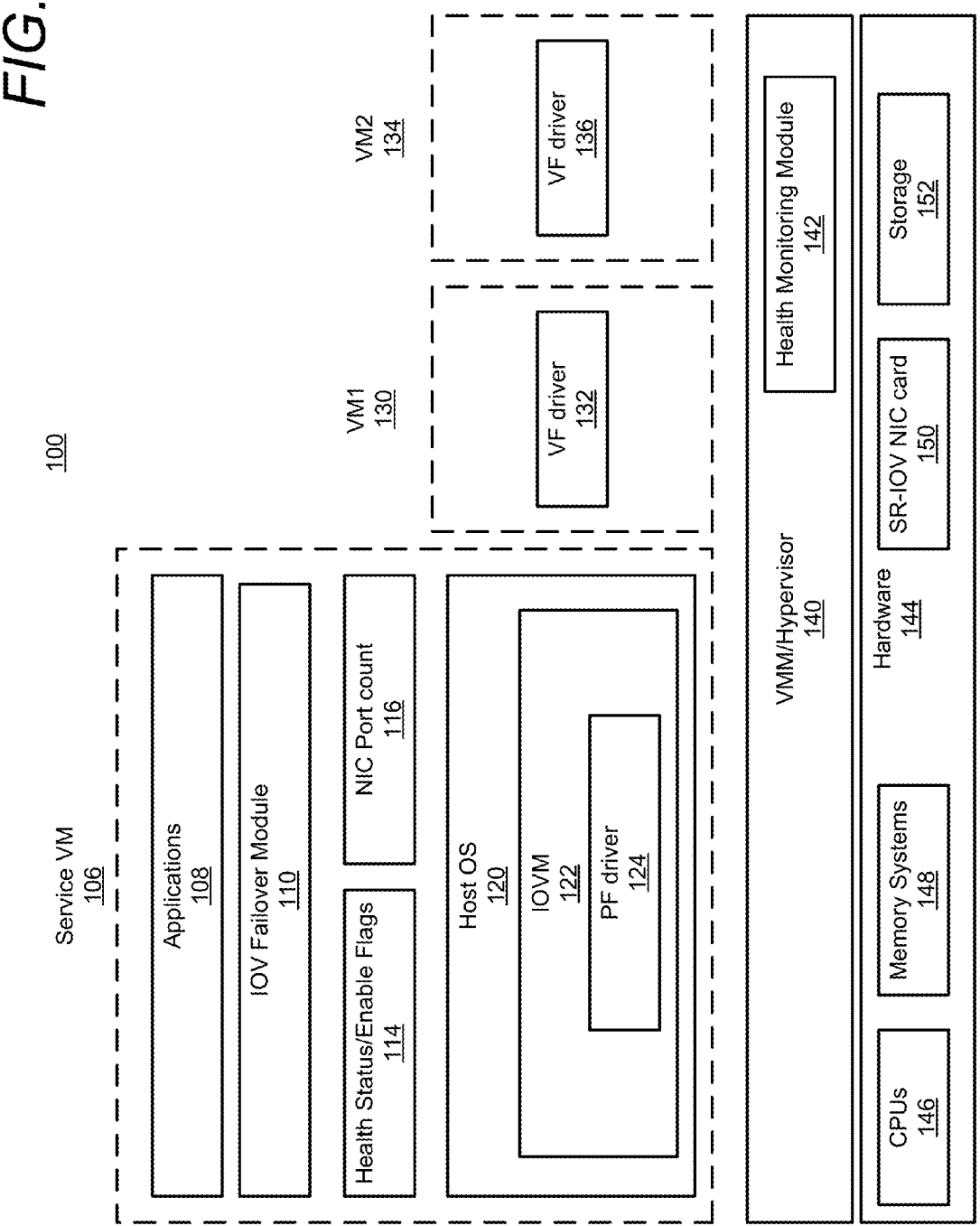
FIG. 1 illustrates an example information handling system (IHS) within which various aspects of the disclosure can be implemented, according to one or more embodiments.

The illustrative embodiments provide a method and an information handling system (IHS) that provides data path failover for a single root input/output virtualization (SR-IOV) network interface controller (NIC) card or SR-IOV NIC card. According to one aspect, an IOV failover module (FM) enables a physical function (PF) driver in a service virtual machine (VM) to access physical resources and configure virtual functions (VFs) within the SR-IOV NIC card. The IOVFM utilizes a health monitoring module (HMM) to monitor data paths established between VMs and corresponding VFs. If a data path fails, the IOVFM initiates a failover by migrating the VF coupled to the failed (or compromised) data path to a redundant VF. However, if a threshold number of consecutive failed migration attempts occurs and the SR-IOV NIC card has an additional and available port(s), the IOVFM enables the PF driver to access and configure an alternate PF of the next available port and migrates the VF to an alternate VF of the available port. The IOVFM enables the VM to access and configure the alternate VF of the available port via a failover data path using an input/output virtualization manager (IOVM)

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of IHS 100/400 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 illustrates a system having virtualized components/resources. IHS 100 includes first service VM component 106 having host OS 120. IHS 100 also includes enhanced VMM 140. Enhanced VMM 140 has an extended support capability associated with input/output virtual machine (IOVM) functionality. In one embodiment, enhanced VMM 140 includes health monitoring module (HMM) 142. The host OS 120 comprises IOVM 122 which includes physical function (PF) driver 124 which manages a physical function of a corresponding IOV Network Interface Controller (NIC). IHS 100 also comprises first virtual machine (VM) 130 having first virtual function (VF) driver 132 and second VM 134 having second VF driver 136.

IHS 100 also comprises hardware 144 which includes central processing units (CPUs)/processors 146 and memory system(s) 148. Processor(s) 146 are coupled to memory system(s) 148 via system interconnect (not shown). The system interconnect can be interchangeably referred to as a system bus, in one or more embodiments. Hardware 144 also includes SR-IOV NIC (card) 150. Also included in hardware 144 is storage 152 within which can be stored one or more software and/or firmware modules and/or data (not specifically shown). In one embodiment, storage 152 can be a hard drive or a solid state drive. The one or more software and/or firmware modules within storage 152 can be loaded into memory system 148 during operation of IHS 100.

Service VM 106 can include therein a plurality of modules which are provided by system memory 148. In particular, service VM 106 can include Basic Input/Output System (BIOS) (not shown), host operating system (OS) 120, application(s) 108 and input/output virtualization (IOV) failover module 110. In one or more embodiments, the BIOS comprises additional functionality associated with unified extensible firmware interface (UEFI). Service VM 106 also includes health status and enable flags 114 and NIC port count 116. The various software and/or firmware modules have varying functionality when their corresponding program code is executed by central processing unit(s) (CPUs)/processor(s) 146 or other processing devices within IHS 100.

As illustrated, IHS 100 comprises a single root IOV network interface controller (NIC) 150. SR-IOV NIC 150 enables IHS 100 to communicate and/or interface with other devices, services, and components that are located external to IHS 100. These devices, services, and components can interface with IHS 100 via an external network (not shown), such as a wide area network (e.g., the Internet), using one or more communication protocols. In particular, in one implementation, IHS 100 uses SR-IOV NIC 150 to connect to a remote/support IHS (not shown) via an external network.

The external network can be a wired local area network, a wireless wide area network, wireless personal area network, wireless local area network, and the like, and the connection to and/or between the external network and IHS 100 can be wired or wireless or a combination thereof.

Figure 2:
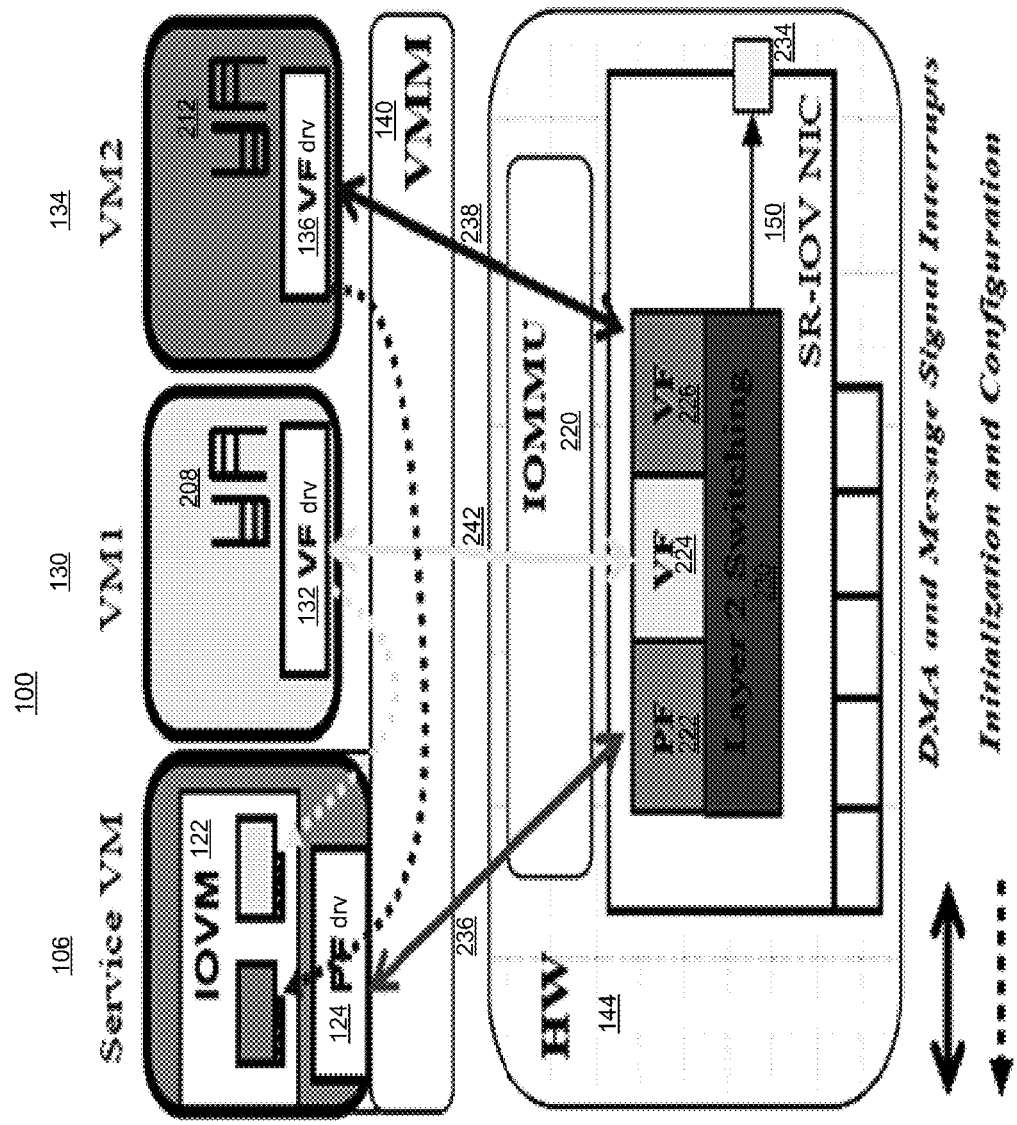
FIG. 2 depicts an SR-IOV architecture of a peripheral component interconnect express (PCIe) device within an IHS, according to one or more embodiments.

With specific reference now to FIG. 2, there is depicted an SR-IOV architecture of a peripheral component interconnect express (PCIe) device within an IHS, according to one or more embodiments. To support descriptions of a failover mechanism enabled by SR-IOV NIC 150 included within IHS 100, a description of the SR-IOV architecture and the associated disclosed aspects is provided. IHS 100 comprises first service VM component 106 having a host OS (not shown) and enhanced VMM 140. Enhanced VMM 140 has an extended support capability associated with input/output virtual machine (IOVM) functionality. The host OS comprises IOVM 122 which includes physical function (PF) driver 124, which manages a physical function of a corresponding IOV NIC. IHS 100 also comprises first virtual machine (VM) 130 having first virtual function (VF) driver 132 and buffers 208, and second VM 134 having second VF driver 136 and buffers 212. IHS 100 also comprises hardware 144 which includes SR-IOV NIC card 150 and input/output memory management unit (IOMMU) 220. SR-IOV NIC card 150 includes switch 230 coupled to port 234. In addition, SR-IOV NIC card 150 comprises a function cluster which includes PF device 222, first VF device 224 and second VF device 226.

PF driver 124 directly accesses all PF resources via network path 236 and is responsible for configuring and managing the VFs (224, 226). PF driver 124 sets the number of VFs, globally enables or disables VFs, and sets up device-specific configurations, such as Media Access Control (MAC) address and virtual LAN (VLAN) settings for network SR-IOV NIC 150. PF driver 124 is specific to the VMM-IOVM/Hypervisor 140 and generally operates in a more privileged environment than other virtual machine drivers. As described herein, SR-IOV is a Single Root IO virtualization specification that allows a PCIe device such as SR-IOV NIC 150 to appear as multiple separate physical PCIe devices for separate VM's.

VF drivers 132, 136 run on respective guest OSes as normal PCIe device drivers and each directly accesses a dedicated VF (i.e., first VF 224 via data path 242 and second VF 226 via data path 238, respectively), for performance data movement, without involving VMM 140.

Enhanced VMM 140 performs virtual machine management functions including creating, starting, stopping and deleting VMs. VMM 140 (e.g., Xen) has been extended to support IOVMs for networking and then optimized for a minimal driver domain. IOVM 122 presents a virtual full configuration space for each VF, so that a guest OS can enumerate and configure the VF as an ordinary device.

Layer 2 switching performed via switch 230 classifies incoming packets, based on MAC and VLAN addresses, directly stores the packets to the recipient's buffer through the DMA, and raises a Message Signal Interrupt (MSI). IOMMU 220 remaps the recipient's DMA buffer address, from the VF driver programmed guest physical address to the machine's physical address.

Figure 3:
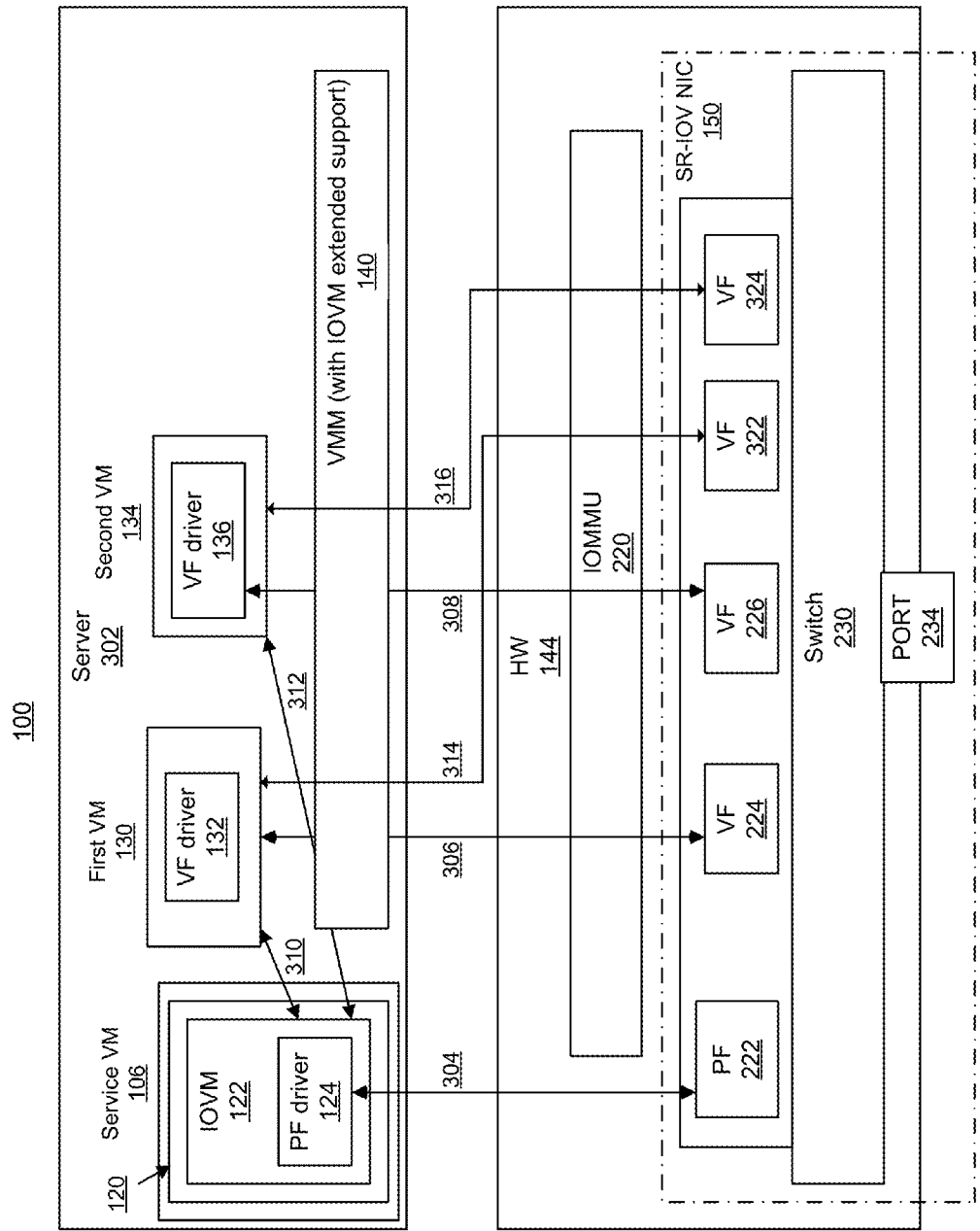
FIG. 3 illustrates a single port SR-IOV NIC card used to support a failover mechanism within an IHS, according to one embodiment.

FIG. 3 illustrates a single port SR-IOV NIC card used to support a failover mechanism within an IHS, according to one embodiment. IHS 100 comprises server/compute node 302 having a service VM 106 that includes host operating system (OS) 120. Server 302 also includes enhanced VMM 140 and has an extended support capability associated with input/output virtual machine (IOVM) functionality. Host OS 120 comprises IOVM 122 which includes physical function (PF) driver 124 which manages a physical function of a corresponding IOV NIC 150. Server 302 also comprises first virtual machine (VM) 130 having first virtual function (VF) driver 132 and second VM 134 having second VF driver 136. IHS 100 also includes hardware 144. Hardware 144 includes SR-IOV NIC card 150 and IOMMU 220. SR-IOV NIC card 150 includes switch 230 coupled to port 234. In addition, SR-IOV NIC card 150 comprises a function cluster comprising PF device 222, first VF device 224, second VF device 226, third VF device 322 and fourth VF device 324.

IHS 100 also depicts a number of access/data paths between device drivers and PF/VF devices. In particular, PF path 304 provides PF driver 124 with access to PF device 222. First VF path 306 provides first VF driver 132 with access to first VF device 224. Second VF path 308 provides second VF driver 136 with access to second VF device 226.

IHS 100 comprises first reconfiguration path 310 coupled between IOVM 122 and first VM 130 to enable IOV failover module 110 (FIG. 1) to reconfigure first VF driver 132 during a failover procedure. In addition, IHS 100 comprises second reconfiguration path 312 coupled between IOVM 122 and second VM 134 to enable IOV failover module 110 (FIG. 1) to reconfigure second VF driver 136 during a corresponding failover procedure. Additionally, IHS 100 includes first VF failover path 314 and second VF failover path 316 between reconfigured VF drivers and redundant/alternate VF devices, respectively.

IOV failover module 110, when executed by a processor, pre-configures alternate VFs (e.g., third VF 322 and fourth VF 324) via PF driver 124 and one or more VF drivers 132, 136, respectively. Processor-executed IOV failover module 110 determines a health status of network/data paths (e.g., first VF path 306, second VF path 308) between VMs 130, 134, and respective VFs (e.g., first VF 224, second VF 226). In response to determining that at least one network path coupled between a VM and a VF has a failed or compromised health status, IOV failover module 110 migrates each one of the VF devices 224 and 226 coupled to compromised network paths (i.e., with respective failed health status) to alternate VF devices 322, 324, respectively, identified using a pre configured mapping. IOV failover module 110 migrates VFs to alternate VFs using SR-IOV NIC 150, without performing switching via enhanced VMM 140. In one embodiment, IOV failover module 110 migrates a first VF device (e.g., VF 224) coupled to a compromised network path to an alternate VF (e.g., VF device 322) by capturing a state of the first VF device (e.g., VF 224) and restoring the captured state within the alternate VF (e.g., VF device 322).

Figure 4:
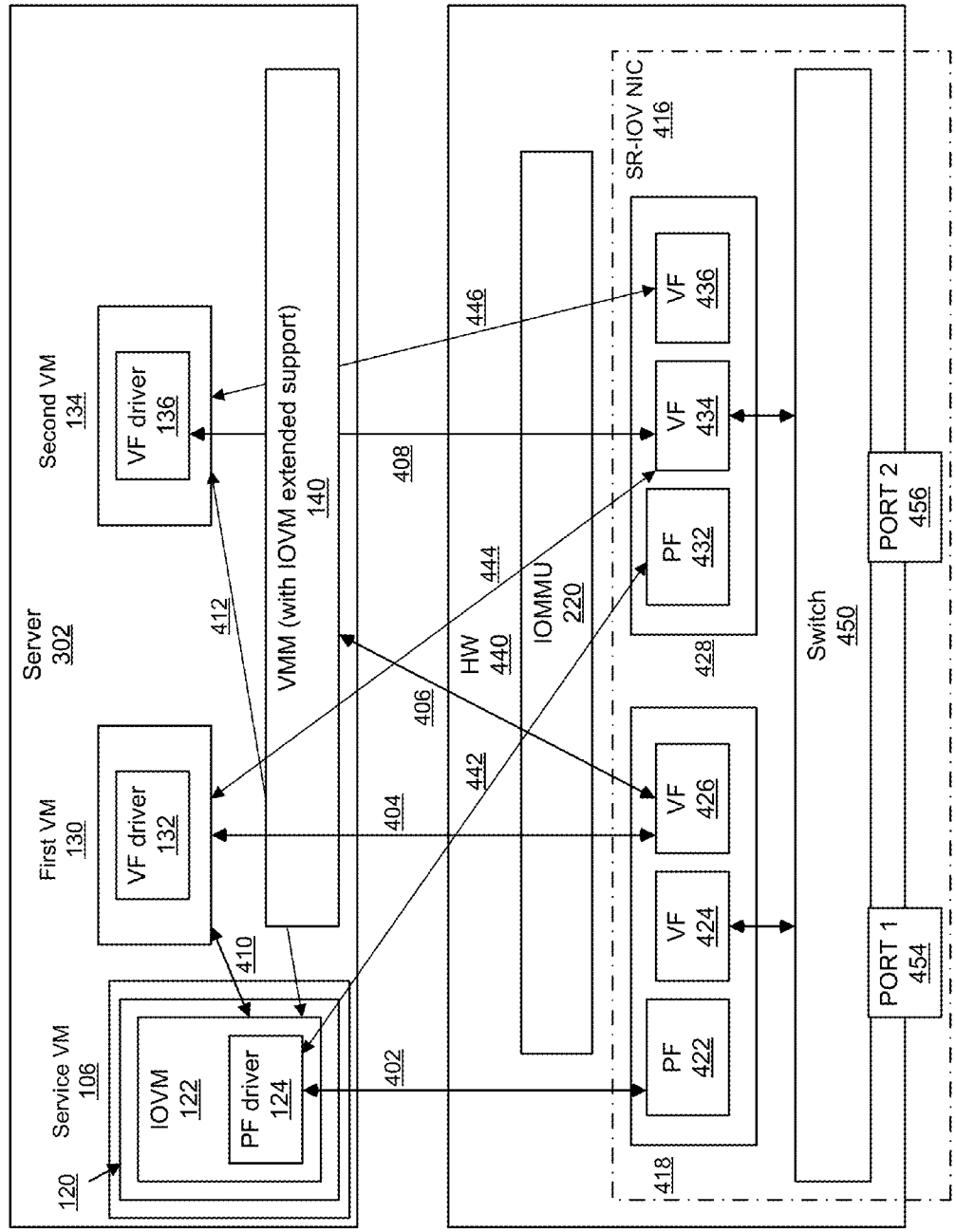
FIG. 4 illustrates a dual port SR-IOV NIC card used to support a failover mechanism within an IHS, according to one embodiment.

FIG. 4 illustrates a dual port SR-IOV NIC card used to support a failover mechanism within an IHS, according to one embodiment. IHS 400 comprises server/compute node 302 having a service VM 106 that includes host operating system (OS) 120. Server 302 also includes enhanced VMM 140 which has an extended support capability associated with input/output virtual machine (IOVM) functionality. Host OS 120 comprises IOVM 122 which includes physical function (PF) driver 124, which manages a physical function of a corresponding SR-IOV NIC card 416. Server 302 also comprises first virtual machine (VM) 130 having first virtual function (VF) driver 132 and second VM 134 having second VF driver 136. IHS 100 also includes hardware 440. Hardware 440 includes dual port SR-IOV NIC card 416 and IOMMU 220. Dual port SR-IOV NIC card 416 includes switch 450 coupled to first port 454 and second port 456. In addition, dual port SR-IOV NIC card 416 comprises port_1 function cluster 418 and port_2 function cluster 428. Port_1 function cluster 418 comprises first PF device 422, first VF device 424 and second VF device 426. Port_2 function cluster 428 comprises second PF device 432, third VF device 434 and fourth VF device 436.

IHS 100 also depicts a number of access/data paths between device drivers and PF/VF devices. In particular, first PF path 402 provides PF driver 124 with access to first PF device 422. First VF path 404 provides first VF driver 132 with access to second VF device 426. Second VF path 408 provides second VF driver 136 with access to third VF device 434.

Coupled between enhanced VMM 140 and port_1 function cluster 418 is monitoring path 406 to enable monitoring of a PF device data path. IHS 100 also comprises first reconfiguration path 410 coupled between IOVM 122 and first VM 130 to enable IOV failover module 110 (FIG. 1) to reconfigure first VF driver 132 during a failover procedure. In addition, IHS 100 comprises second reconfiguration path 412 coupled between IOVM 122 and second VM 134 to enable IOV failover module 110 (FIG. 1) to reconfigure second VF driver 136 during a failover procedure. Additionally, IHS 100 includes PF (device) failover path 442, first VF failover path 444 and second VF failover path 446 between reconfigured PF/VF drivers and respective redundant PF/VF devices, respectively.

In one embodiment, IHS 100 includes within enhanced VMM 140 health monitoring module (HMM) 142 (FIG. 1). IOV failover module 110 receives from HMM 142 health status information for at least one of (a) network paths connecting a VM to a VF and (b) PFs of SR-IOV NIC card 416. Memory system 148 and/or IOV failover module 110 also includes a threshold number for failover mapping and a pre-configured mapping utilized to identify alternate failover paths for each VM (FIG. 1).

IOV failover module 110 allocates to failed/compromised network path recovery mechanisms a selected number of redundant, alternate VFs from among an identified total number of VFs that can be configured/simulated within SR-IOV NIC card 416.

While first VM 130 utilizes/accesses redundant/alternate VF (e.g., third VF 434), second VM 134 also utilizes/accesses redundant VF (e.g., third VF 434). As a result, a single, redundant VF is shared by multiple VMs. According to one aspect, a redundant VF can become detached from a VM, where the redundant VF was being utilized by one of (i) a single VM which has become detached from the VF, and (ii) multiple VMs, including a VM that has become detached from the VF. In some cases, a configuration mismatch occurs which prevents a next VM from attaching to a previously attached VF, or, alternatively, from remaining attached to a VF that was previously detached from one of multiple VMs. IOV failover module 110 initiates a VF failover procedure as a result of the configuration mismatch.

IOV failover module 110, when executed by a processor, pre-configures alternate VFs (e.g., second VF 426 on a first port/cluster of SR-IOV NIC card 416, third VF 434 and fourth VF 436 on a second port/cluster of SR-IOV NIC card 416) and alternate/additional PFs (e.g., second PF 432) via PF driver 124 and one or more VF drivers 132, 136, respectively. Processor-executed IOV failover module 110 determines a health status of network/data paths (e.g., first VF path 404) between a VM(s), such as first VM 130, and respective VFs, such as second VF 426. In response to determining that at least one network path coupled between a VM and a VF has a failed health status, IOV failover module 110 migrates each one of the VF devices (e.g., first VF 424) coupled to a compromised network path to a respective alternate VF device (e.g., second VF 426, third VF 434) identified using a pre-configured mapping. IOV failover module 110 migrates a VF, such as first VF 424, to an alternate VF such as second VF 426, using SR-IOV NIC card 416, without performing switching via enhanced VMM 140.

In response to migrating each one of the VF devices coupled to a network path with a failed health status to a respective alternate VF device, IOV failover module 110 determines a health status of network/data paths between the VM(s) and respective alternate VFs. If IOV failover module 110 further determines that at least one network/data path (e.g., failover path 444) coupled between a VM (e.g., first VM 130) and an alternate VF (e.g., third VF 434) has a failed health status, IOV failover module 110 migrates each one of the alternate VF devices (e.g., third VF 434) coupled to a network path with a failed health status to a respective next alternate VF device (e.g., fourth VF 436), such as identified using a pre-configured mapping.

Within the description, a network path that is determined to have a failed health status result can be interchangeably referred to as a compromised network path, for simplicity. Accordingly, IOV failover module 110 determines a health status of network paths between the at least one VM and respective VF devices to identify whether any network path is a compromised network path having a failed health status. Then, in response to determining that at least one network path coupled between a VM and a VF device has a failed health status, IOV failover module 110 migrates each one of the VF devices coupled to a compromised network path to a respective alternate VF device identified using a pre-configured mapping. According to one aspect, migrating a VF device to an alternate VF device is performed using the SR-IOV NIC card without performing VMM switching.

In one embodiment, processor-executed IOV failover module 110 retrieves a threshold number for consecutive failed attempts caused by failed network paths, which is permitted while migrating a VF to an alternate VF and/or a next alternate VF using a same IOV NIC port. IOV failover module 110 uses the retrieved threshold number to determine whether at least the threshold number of compromised network paths when coupling a VM to respective alternate VF devices has been reached. In response to determining that the threshold number of compromised network paths has not been reached, IOV failover module 110 repeatedly performs a sequence of functions comprising (i) determining a health status of a network path from a respective VM to an alternate VF device in response to VF device migration and (ii) migrating each one of the VF devices coupled to the network path having the failed health status to the respective alternate VF device.

In response to determining that at least the threshold number of compromised network paths when coupling a VM to respective alternate VF devices has been reached, IOV failover module 110 determines a number of ports with which the SR-IOV NIC is configured. In response to determining that the SR-IOV NIC is configured as a multi-port SR-IOV NIC, IOV failover module 110 determines a health status of a network path corresponding to an alternate VF device, in response to a most recent migration. In response to determining that the network path corresponding to the alternate VF device associated with the most recent migration has a failed health status, IOV failover module 110 migrates each one of the alternate VF devices coupled to a network path with a failed health status to a respective alternate VF device on a next port of IOV NIC 416, identified using a pre-configured mapping.

In response to migrating each one of the alternate VF devices coupled to a network path with a failed health status to a respective alternate VF device on a next port of the IOV NIC, IOV failover module 110 repeatedly performs a sequence of functions comprising (i) determining a health status of a network path from a respective VM to an alternate VF device in response to migrating an alternate VF to a next alternate VF and (ii) migrating each one of the VF devices coupled to a network path with a failed health status to a respective next alternate VF device, according to a threshold number for consecutive failed attempts and a number of available ports of SR-IOV NIC card 416.

According to one or more aspects, in response to determining that the IOV NIC is configured as a SR-IOV NIC card having a single port, IOV failover module 110 provides at least one of updates to one or more health status flags and a notification about network path or port status failures to a user via a visual display. In response to determining that at least one network path coupled between a VM and a newly-provided alternate VF has an operational health status, IOV failover module 110 utilizes IOVM (module) 122 to enable the VM to efficiently configure the newly-provided alternate VF.

In one embodiment, IOV failover module 110 enables or disables health monitoring of a PF device data path by setting a corresponding PF health monitor enable/disable flag (i.e., from among enable flags 114 (FIG. 1)) to a value of "0" (i.e., disable) or "1" (i.e., enable). By disabling health monitoring of the PF device data path, IOV failover module 110 avoids using an alternate/redundant PF device during a failover procedure within a dual-port or multi-port SR-IOV NIC. However, if IOV failover module 110 enables health monitoring of the PF device data path, IOV failover module 110 provides a further enhanced failover mechanism that includes PF device data path monitoring and possible failover path to an alternate/redundant port of a dual port or multi-port SR-IOV NIC. In more or more embodiments, IOV failover module 110 provides a display notification indicating whether the further enhanced failover mechanism that includes PF device data path monitoring is being provided.

According to one or more aspects, IOV failover module 110 maintains separate health status flags (i.e., of health status flags 114) for health monitoring of VF device data path(s) and health monitoring of PF device data path(s). If data path health for a VF device is critical, a corresponding flag is set to "0", indicating a failed or compromised data path associated with the VF device, and IOV failover module 110 migrates the VF device to an alternate VF device using a pre-configured mapping. Similarly, if IOV failover module 110 determines that there is also a critical health issue with PF related functionality, IOV failover module 110 sets a corresponding flag to "0" and migrates the PF along with the VF. IOV failover module 110 avoids failover latency, by utilizing pre-configured mappings to support the failover mechanism. IOV failover module 110 maintains updated values for all health status flags.

Figure 5:
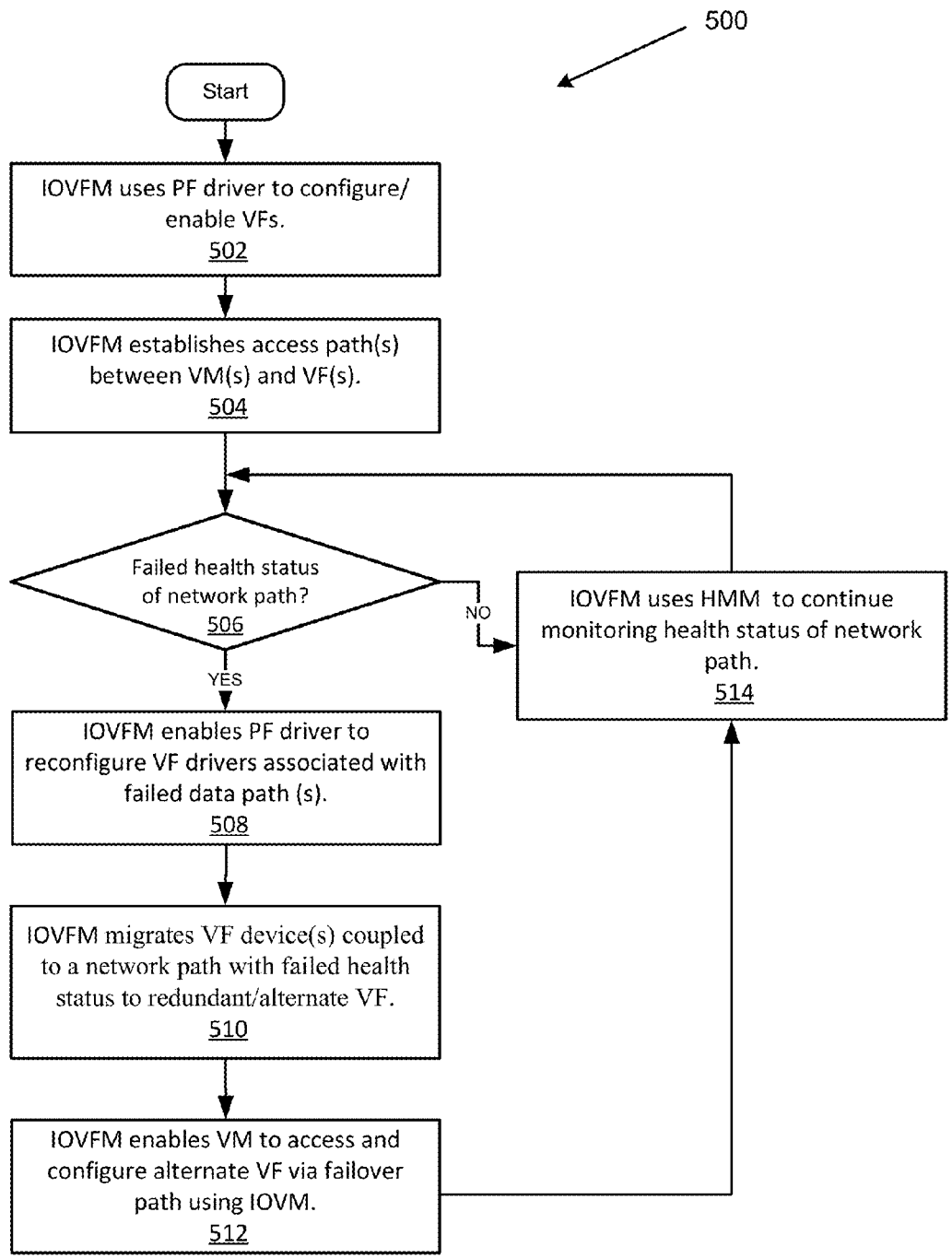
FIG. 5 is a flow chart illustrating a method for providing a failover mechanism by utilizing a single port SR-IOV NIC card, according to one embodiment.
Figure 6:
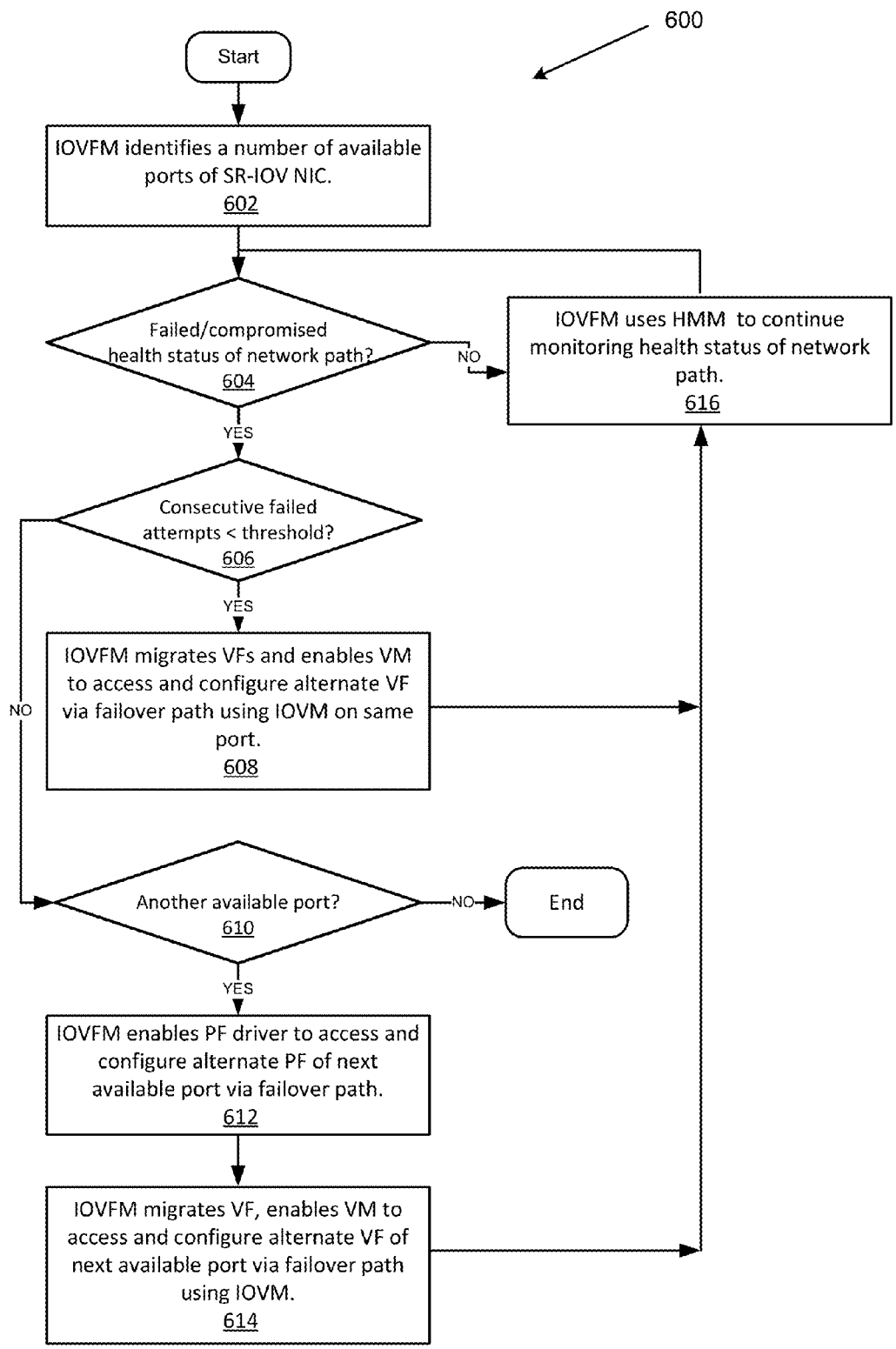
FIG. 6 is a flow chart illustrating a method for providing a failover mechanism by utilizing a dual port SR-IOV NIC card, in accordance with one or more embodiments.

FIG. 5 and FIG. 6 present flowcharts illustrating example methods by which IHS 100 and specifically IOV failover module 110 presented within the preceding figures perform different aspects of the processes that enable one or more embodiments of the disclosure. Generally, method 500 and method 600 collectively represent methods for detecting data path failures and providing failovers to correct the failures within IHS 100. The description of each method is provided with general reference to the specific components illustrated within the preceding figures. It is appreciated that certain aspects of the described methods may be implemented via other processing devices and/or execution of other code/firmware. In the discussion of FIG. 5 and FIG. 6, reference is also made to elements described in FIGS. 1-4.

FIG. 5 is a flow chart illustrating a method for performing failover in a single port SR-IOV NIC card, according to one embodiment. Method 500 begins at the start block and proceeds to block 502 at which IOV failover module (FM) 110 uses PF driver 124 to configure/enable VFs. IOV FM 110 establishes access/data path(s) between VM(s) and VF(s) (block 504). IOV FM 110 determines whether a network/data path(s) between a VM and a respective VF has a failed health status (decision block 506). If a monitored data path does not have a failed health status, IOV FM 110 uses HMM 142 to continue monitoring the health status of network/data paths (block 514). However, if a data path has a failed health status, IOV FM 110 enables PF driver to reconfigure VF drivers associated with failed data path(s) (block 508). IOV FM 110 migrates VF device(s) coupled to a network path with failed health status to redundant/alternate VFs (block 510). IOVFM 110 enables the VM to access and configure an alternate VF via a respective failover path using IOVM 122 (block 512). IOV FM 110 uses HMM 142 to monitor a health status of network/data paths corresponding to the alternate VF (block 514).

FIG. 6 is a flow chart illustrating a method for performing failover in a multi-port SR-IOV NIC card, in accordance with one or more embodiments. Method 600 begins at the start block and proceeds to block 602 at which IOV FM 110 identifies a number of available ports of SR-IOV NIC card 416. IOV FM 110 determines whether a network/data path (s) between a VM and a respective VF has a failed health status (decision block 604). If a monitored data path does not have a failed health status, IOV FM 110 uses HMM 112 to continue monitoring the health status of network/data paths (block 616). However, if a data path has a failed health status, IOV FM 110 determines whether a number of consecutive failed attempts to connect the VM with a working data path (failover path) is less than a threshold number (decision block 606). If the number of consecutive failed attempts is less than a threshold number, IOV FM 110 migrates VFs and enables the VM to access and configure an alternate VF via failover path using IOVM 122 on the same port of SR-IOV NIC card 416 (block 608). However, if the number of consecutive failed attempts is not less than the threshold number, IOV FM 110 determines whether SR-IOV NIC 416 is a multi-port device which has another available port providing additional, alternate VFs to continue the failover process (decision block 610). If there is an available port to continue the failover process, IOV FM 110 enables PF driver 124 to access and configure an alternate PF (e.g., second PF 432) of the next available port via failover path 442 (block 612). IOV FM 110 migrates the VF corresponding to the failed network path, and enables the VM to access and configure the alternate VF of the next available port via failover path 444 using IOVM 122 (block 614). IOV FM 110 uses HMM 142 to continue monitoring the health status of network/data paths (block 616). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   an input/output (I/O) virtualization network interface controller (IOV NIC);
   a processor;
   at least one virtual machine (VM) having a respective virtual function (VF) device driver and direct access to a corresponding VF device of the IOV NIC;
   a virtual machine manager (VMM) having an extended support capability for input/output virtual machine (IOVM) functionality; and
   an IOVM module having a physical function (PF) driver for managing a physical function of the IOV NIC; and
   an IOV failover module executed by said processor to:
      establish one or more network paths between at least one VM and a VF, respectively;

determine a health status of network paths between the at least one VM and respective VF devices to identify whether any network path is a compromised network path having a failed health status;

in response to determining that at least one network path coupled between a VM and a VF device has a failed health status, migrate each one of the VF devices coupled to a compromised network path to a respective alternate VF device identified using a pre-configured mapping, wherein said migrating a VF device to an alternate VF device is performed using the IOV NIC without performing VMM switching;

in response to migrating each one of the VF devices coupled to a compromised network path to a respective alternate VF device, determine a health status of network paths between the at least one VM and respective alternate VF devices;

retrieves a value of a threshold number of consecutive failed attempts caused by compromised network paths that is permitted for migrating a VF device to the respective alternate VF device using a same IOV NIC port;

determines whether at least the threshold number of alternate network paths for coupling a VM to respective alternate VF devices has been reached; and in response to the threshold number not having been reached, repeatedly performs said sequence of functions comprising (i) said determining a health status of a network path from a respective VM to an alternate VF device in response to said migrating and (ii) said migrating each one of the VF devices coupled to said compromised network path to said respective alternate VF device.

2. The IHS of claim 1, wherein the processor-executed IOV failover module:

in response to determining that at least one network path coupled between a VM and an alternate VF device has a failed health status, migrate each one of the alternate VF devices coupled to a compromised network path to a respective next alternate VF device identified using the pre-configured mapping.

3. The IHS of claim 1, wherein the processor-executed IOV failover module:

in response to determining that a number of migrations of a VM to respective alternate VF devices has reached the threshold number:

determine a number of ports with which the IOV NIC is configured;

in response to determining that the IOV NIC is configured as a multi-port IOV NIC:

determine a health status of a network path corresponding to an alternate VF device from a most recent migration; and in response to determining that the network path corresponding to the alternate VF device associated with the most recent migration has a failed health status, migrate each one of the alternate VF devices coupled to a compromised network path to a respective alternate VF device on a next port of the IOV NIC, identified using the pre-configured mapping.

4. The IHS of claim 3, wherein the processor-executed IOV failover module:

in response to migrating each one of the alternate VF devices coupled to a compromised network path to a respective alternate VF device on a next port of the IOV NIC, repeatedly performs a sequence of functions comprising (i) determining a health status of a network path from a respective VM to an alternate VF device in response to migrating an alternate VF device to a next alternate VF device and (ii) migrating each one of the VF devices coupled to a compromised network path to a respective next alternate VF device, according to a threshold number for consecutive failed attempts and a number of available ports of the IOV NIC.

5. The IHS of claim 3, wherein the processor-executed IOV failover module:

in response to determining that the IOV NIC is configured as a SR-IOy NIC having a single port, provides one or more of: updates to one or more health status flags; and a notification about network path or port status failures.

6. The IHS of claim 1, wherein the IOV failover module:

pre-configures alternate VF devices and additional PFs using the one or more VF device drivers.

7. The IHS of claim 1, wherein the IOV failover module:

in response to determining that at least one network path coupled between a VM and a newly provided alternate VF device has an operational health status, utilizing the IOVM module to enable the VM to efficiently configure the newly provided alternate VF device.

8. The IHS of claim 1, wherein the memory system further comprises:

a health monitoring module (HMM);

wherein the IOV failover module receives, from the HMM, health status information for at least one of (a) network paths used to connect a VM to a VF device and (b) PFs of the IOV NIC.

9. The IHS of claim 1, wherein the IOV failover module:

allocates to failed network path recovery mechanisms a selected number of redundant, alternate VF devices from among an identified total number of VF devices that can be configured within the IOV NIC.

10. In an information handling system (IHS), a method comprising:

establishing one or more network paths between at least one VM and a VF, respectively;

determining a health status of network paths between the at least one VM and respective VF devices to identify whether any network path is a compromised network path having a failed health status;

in response to determining that at least one network path coupled between a VM and a VF device has a failed health status, migrating each one of the VF devices coupled to a compromised network path to a respective alternate VF device identified using a pre-configured mapping, wherein said migrating a VF device to an alternate VF device is performed using the IOV NIC without performing VMM switching;

in response to migrating each one of the VF devices coupled to a compromised network path to a respective alternate VF device, determining a health status of network paths between the at least one VM and respective alternate VF devices;

retrieving a value of a threshold number of consecutive failed attempts caused by compromised network paths that is permitted for migrating a VF device to the respective alternate VF device using a same IOV NIC port;

determining whether at least the threshold number of alternate network paths for coupling a VM to respective alternate VF devices has been reached; and in response to the threshold number not having been reached, repeatedly performing said sequence of functions comprising (i) said determining a health status of a network path from a respective VM to an alternate VF device in response to said migrating and (ii) said migrating each one of the VF devices coupled to said compromised network path to said respective alternate VF device.

11. The method of claim 10, further comprising:
in response to determining that at least one network path coupled between a VM and an alternate VF device has a failed health status, migrating each one of the alternate VF devices coupled to a compromised network path to a respective next alternate VF device identified using the pre-configured mapping.

12. The method of claim 10, further comprising:
in response to determining that a number of migrations of a VM to respective alternate VF devices has reached the threshold number:
determining a number of ports with which the IOV NIC is configured;
in response to determining that the IOV NIC is configured as a multi-port IOV NIC:
determining a health status of a network path corresponding to an alternate VF device from a most recent migration; and
in response to determining that the network path corresponding to the alternate VF device associated with the most recent migration has a failed health status, migrating each one of the alternate VF devices coupled to a compromised network path to a respective alternate VF device on a next port of the IOV NIC, identified using the pre-configured mapping.

13. The method of claim 12, further comprising:
in response to migrating each one of the alternate VF devices coupled to a network path with a failed health status to a respective alternate VF device on a next port of the IOV NIC, repeatedly performing a sequence of functions comprising (i) determining a health status of a network path from a respective VM to an alternate VF device in response to migrating an alternate VF device to a next alternate VF device and (ii) migrating each one of the VF devices coupled to a compromised network path to a respective next alternate VF device, according to a threshold number for consecutive failed attempts and a number of available ports of the IOV NIC.

14. The method of claim 12, further comprising:
in response to determining that the IOV NIC is configured as a SR-IOV NIC having a single port, provides one or more of: updates to one or more health status flags; and a notification about network path or port status failures.

15. The method of claim 10, further comprising:
pre-configuring alternate VFs and additional PFs via the one or more VF drivers.

16. The method of claim 10, further comprising:
in response to determining that at least one network path coupled between a VM and a newly provided alternate VF has an operational health status, utilizing the IOVM module to enable the VM to efficiently configure the newly provided alternate VF.

17. The method of claim 10, further comprising:
receiving health status information for at least one of (a) network paths connecting a VM to a VF and (b) PFs of the IOV NIC.

18. The method of claim 10, further comprising:
allocating to failed network path recovery mechanisms a selected number of redundant, alternate VFs from among an identified total number of VFs that can be configured/simulated within the IOV NIC.

* * * * *